(12) United States Patent
Stevenson

(10) Patent No.: US 12,203,379 B2
(45) Date of Patent: Jan. 21, 2025

(54) GAS TURBINE ENGINE TEMPERATURE MEASUREMENT SYSTEM

(71) Applicant: ROLLS-ROYCE PLC, London (GB)

(72) Inventor: Guy Stevenson, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/594,226

(22) Filed: Mar. 4, 2024

(65) Prior Publication Data

US 2024/0309777 A1 Sep. 19, 2024

(30) Foreign Application Priority Data

Mar. 16, 2023 (GB) ..................................... 2303821

(51) Int. Cl.
| | |
|---|---|
| *G01K 1/02* | (2021.01) |
| *F01D 21/00* | (2006.01) |
| *F02C 7/22* | (2006.01) |
| *G01K 7/02* | (2021.01) |
| *G01K 11/32* | (2021.01) |

(52) U.S. Cl.
CPC .............. *F01D 21/003* (2013.01); *F02C 7/22* (2013.01); *G01K 1/026* (2013.01); *G01K 7/02* (2013.01); *G01K 11/32* (2013.01); *F05D 2260/83* (2013.01); *G01K 2205/00* (2013.01)

(58) Field of Classification Search
CPC ......... F01D 21/003; F02C 7/22; G01K 1/026; G01K 7/02; G01K 11/32; G01K 2205/00; G01K 2205/04; F05D 2260/83
See application file for complete search history.

(56) References Cited

U.S. PATENT DOCUMENTS

| | | | | |
|---|---|---|---|---|
| 3,580,744 | A | * | 5/1971 | Inouye ..................... G01K 7/02 374/139 |
| 4,362,057 | A | * | 12/1982 | Gottlieb ................. G01K 11/32 374/E11.015 |
| 5,121,596 | A | | 6/1992 | Takehara et al. |
| 5,828,797 | A | * | 10/1998 | Minott .................. F01D 21/003 385/115 |
| 9,228,448 | B2 | | 1/2016 | Wind et al. |
| 9,599,514 | B2 | | 3/2017 | Estevadeordal et al. |
| 10,697,316 | B2 | | 6/2020 | Boyd |

(Continued)

FOREIGN PATENT DOCUMENTS

GB          972394 A       10/1964

OTHER PUBLICATIONS

Sep. 19, 2023 Search Report issued in British Patent Application No. 2303821.9.

(Continued)

*Primary Examiner* — Steven M Sutherland
(74) *Attorney, Agent, or Firm* — Oliff PLC

(57) ABSTRACT

A temperature measurement system for a gas turbine engine, the gas turbine engine including, in axial flow sequence, a compressor section, a combustor section having plural fuel spray nozzles, and a turbine section. The temperature measurement system includes one or more optical thermometers, each optical thermometer configured to measure the temperature of a component washed by the working gas of the engine, the or each component being in the combustor section or the turbine section at a first position along the axis of the engine.

16 Claims, 6 Drawing Sheets

(56) References Cited

U.S. PATENT DOCUMENTS

| | | | |
|---|---|---|---|
| 2006/0000219 A1 | 1/2006 | Myhre | |
| 2008/0310804 A1* | 12/2008 | Brummel | F23N 5/082 |
| | | | 385/115 |
| 2012/0002035 A1 | 1/2012 | Li et al. | |
| 2014/0064332 A1* | 3/2014 | Johnston | G01K 11/3206 |
| | | | 374/161 |
| 2017/0314464 A1 | 11/2017 | Wang et al. | |

OTHER PUBLICATIONS

Sep. 10, 2024 European Search Report issued in European Patent Application No. 24160439.6.

* cited by examiner

GAS TURBINE ENGINE TEMPERATURE MEASUREMENT SYSTEM

This specification is based upon and claims the benefit of priority from UK Patent Application Number 2303821.9 filed on 16 Mar. 2023, the entire contents of which are incorporated herein by reference.

FIELD OF THE DISCLOSURE

The present invention relates to a temperature measurement system for a gas turbine engine and a combination of a temperature measurement system and an engine control system.

BACKGROUND OF THE DISCLOSURE

It is desirable to measure the temperature in certain sections of a gas turbine engine in order to be able to provide acceptable protection of engine components against over temperature. Exceeding design temperatures within sections of the engine leads to greater oxidation of engine components in those sections and correspondingly shortens the lifespan of such components and the gas turbine engine as a whole.

Conventionally, temperature is measured using a temperature measuring system comprising a plurality of dual immersion thermocouples positioned in the gas turbine system. Different arrangements of the thermocouples are possible to be able to measure different temperature profiles within the gas turbine system. Often, thermocouples are arranged circumferentially in the turbine section such that a circumferential temperature profile can be measured.

Thermocouples are effective at measuring the temperature in the turbine section over a wide range of temperatures. This allows the temperature measuring system to be of use in detecting events at low temperatures such as engine light up and flame out, and also of use in detecting events at the higher temperatures during normal operating conditions. However, thermocouples are easily damaged and can lose accuracy through oxidation.

The present invention has been devised in light of the above considerations.

SUMMARY OF THE INVENTION

In a first aspect there is provided a temperature measurement system for a gas turbine engine, the gas turbine engine comprising, in axial flow sequence, a compressor section, a combustor section having plural fuel spray nozzles, and a turbine section, the temperature measurement system comprising one or more optical thermometers, each optical thermometer configured to measure the temperature of a component washed by the working gas of the engine, the or each component being in the combustor section or the turbine section at a first position along the axis of the engine.

Thermocouples are prone to degradation and oxidation over time and thus have a tendency for their calibration to drift. Optical thermometers, on the other hand, may be more robust and reliable than the conventional thermocouples used in gas turbine engines for working gas temperature measurement, demonstrating better noise performance and lower calibration drift. Accordingly, a temperature measurement system utilising optical thermometers in place conventional thermocouples can be more robust and has less of a requirement for sensor redundancy (i.e. multiple back-up thermocouples in conventional temperature measurement systems), facilitating a simpler, longer-lived and cheaper temperature measurement system. Measuring the temperature of components of the gas turbine engine washed by the working gas of the engine is of particular importance because it is these components that are most prone to wear due to the high temperatures.

The one or more optical thermometers may be configured to measure the temperature of a surface within the combustor section or the turbine section. The temperature measurement system may be configured to then convert the surface temperature into a working gas temperature. Conversion of the surface temperature into a working gas temperature may be effected by heat transfer modelling.

The temperature measurement system may further comprise one or more further optical thermometers, each further optical thermometer configured to measure the temperature of a component washed by the working gas of the engine, the or each component being in the combustor section or the turbine section at a second position along the axis of the engine.

Where the temperature measurement system comprises plural of the optical thermometers, the optical thermometers may be arranged in an optical thermometer array configured to measure a circumferential temperature profile of the engine at the first position. For example, where a component extends circumferentially around the rotational axis of the gas turbine engine or there is a circumferential row of components around the rotational axis, the plural optical thermometers may be positioned to measure the temperature of the component(s) at plural circumferential positions, This allows the circumferential temperature profile to be monitored and utilised in control of the gas turbine engine.

Where there are plural optical thermometers arranged in an optical thermometer array, the number of optical thermometers within the optical thermometer array may be equal to the number of fuel spray nozzles. In practice, the swirl of the gas flow through the engine, the mixing of gas from adjacent sectors down the engine and the fuel spray nozzles spraying fuel into adjacent sectors may mean there is no simple correspondence between a single fuel spray nozzle and a respective optical thermometer. Nevertheless, by positioning the optical thermometer array further upstream in the engine than a conventional thermocouple-based array and accounting for the above factors, the temperature measurement system can correlate the temperature at a certain circumferential position to the performance of one or more fuel spray nozzles. This then allows areas of likely high wear to be identified based on the circumferential sectors of the engine that are exposed to the highest temperatures and the operating conditions for which those areas are rated, meaning that targeted physical inspection can subsequently be conducted.

Where the turbine section comprises a circumferential row of nozzle guide vanes at the entrance into the turbine section from the combustor section, the or each optical thermometer may be configured to measure the temperature of a respective nozzle guide vane. This allows the temperature of nozzle guide vanes to be monitored in comparison to their design temperature. This also allows the temperature measured by the or each optical thermometer to be correlated to the performance of a given fuel spray nozzle by accounting for the temperature of a given nozzle vane guide, the spread of the fuel sprayed from the nozzle guide vanes, and the amount of swirl in the gas flow within the engine.

The or each optical thermometer may be installed within a thermo well in its nozzle guide vane. This helps the or each optical thermometer to accurately measure the temperature of its respective nozzle guide vane. The temperature of the nozzle guide vane may be converted into a working gas temperature based on heat transfer modelling in order to indirectly measure the working gas temperature. Monitoring the temperature of a component is important when considering a component's wear rate and lifetime.

Similarly to the possible positioning of optical thermometers in thermo wells in the nozzle guide vane, the or each optical thermometer may be positioned in a thermo well provided in another component of the gas turbine section and/or engine. Possible locations of thermo wells include, for example, the combustor liner and the turbine casing.

Alternatively, or additionally, the temperature measurement system may comprise one or more test bodies configured to be disposed in the combustor section or the turbine section such that the or each test body is a component washed by the working gas of the engine. The or each test body may comprise a thermo well, and the or each optical thermometer may be configured to be inserted into the thermo well of its respective test body to measure the temperature of said test body.

A thermo well may be defined as a recess or cavity provided in a body that has a geometry such that it is a black body cavity (i.e. has an emissivity approximately equal to one, for example in the range 0.9 to 1.0). A thermo well may be formed in a body using electrical discharge machining (EDM).

The or each optical thermometer may comprise an optical fibre and a respective photodiode, the optical fibre comprising a first end configured to collect electromagnetic radiation emitted from the respective component, and a second end connected to the respective photodiode. Accordingly, the temperature of a body can be measured by the optical fibre collecting electromagnetic radiation emitted from the surface of that body and transmitting that radiation to the photodiode, which can convert the radiation into an electrical signal. This facilitates the location of the photodiode in an environment that is suitable for electrical equipment (i.e. away from the high temperatures of the turbine section) whilst still allowing the optical thermometers to be used to measure the temperatures in the combustion or turbine section. The first end of the optical fibre may collect radiation emitted from a surface directly i.e. absent any focussing optics and/or a pyrometer. The or each photodiode may be an InGaAs photodiode. The or each photodiode may be located in a photodiode sensing unit, the photodiode sensing unit containing additional electronic components for processing the signal from the photodiode. The photodiode sensing unit may be configured to convert the electrical signal provided by the or each photodiode into a temperature reading. This arrangement of the optical thermometer does not require a pyrometer.

The second end of the or each optical fibre may be connected to the respective photodiode by coupling optics comprising one or more lenses. Using coupling optics increases the proportion of radiation that leaves the second end of an optical fibre and reaches the photodiode, thereby increasing the signal strength and the measurement accuracy. According to another option, however, the second end of the or each optical fibre may be connected to the respective diode without lenses interposed therebetween. Omitting coupling lenses can make the temperature measurement system more compact.

The optical fibre within the optical thermometer may comprise a sapphire optical fibre section. Sapphire is highly inert and therefore suitable for use in the high temperature environment of the turbine section, typically being able to withstand ambient temperatures of up to 1900° C. The entire length of the optical fibre may be a sapphire optical fibre. Alternatively, one portion of the optical fibre's length may be a sapphire optical fibre section and another portion of its length may be formed from another, non-sapphire-based, optical fibre section, for example, a silica optical fibre section. Accordingly, the use of sapphire optical fibre can be confined to sections where the temperature is too high to use other types of optical fibre, for example, a silica optical fibre.

The sapphire optical fibre section may have a diameter greater than or equal to approximately 100 μm. Advantageously, small diameter optical fibres, such as a 100 μm fibre, have small minimum bend radii, for example, a 100 μm diameter sapphire fibre has a minimum bend radius of 20 mm. This makes routing of the optical fibre easier. However, small diameter optical fibres are more susceptible to fracturing. Optionally, the sapphire optical fibre section may have a diameter of approximately 450 μm, Increasing the fibre diameter above 100 μm increases the minimum bend radius (e.g. a 450 μm sapphire optical fibre has a minimum bend radius of 80 mm), but also makes the optical fibre more resistant to fracturing.

The optical fibre may be encased in a sheath to protect the optical fibre from damage, for example, a stainless-steel sheath.

The or each optical thermometer may have an operational temperature range (e.g. the rated temperature range for the optical thermometer) whose lower bound is greater than or equal to 500° C. The or each optical thermometer may have an operational temperature range whose upper bound is less than or equal to 1800° C. By having the operational temperature range be focussed on the upper portion of the range of working gas temperatures seen in the turbine section, greater signal strength and measurement accuracy can be provided at the high temperatures where the greatest challenge exists for the integrity of turbine components and the delivery of internal cooling air. To provide an optical thermometer having an operational temperature range that extends to 1800° C. and uses a test body exposed to the gas flow path through the turbine section, the material selected for the test body typically has a high emissivity and also has high resistance to erosion and oxidation. Suitable materials include, for example, tungsten and alloys thereof.

The temperature measurement system may further comprise one or more thermocouples configured to measure working gas temperatures in the turbine section at a second position along the axis of the engine. By providing two different types of temperature measurement at different axial positions within the turbine section, more accurate temperature measurement can be realised and accordingly tighter control of the temperatures within the turbine section relative to set point temperatures can be achieved. Moreover, by combining one or more optical thermometers with one or more thermocouples within the temperature measurement system, the number of thermocouples required within the turbine section can be reduced compared to a conventional temperature measurement system and the temperature measurements from one type of sensor can corroborate the temperature measurements from the other type of sensor. Furthermore, thermocouples conventionally have operational temperature ranges that cover the entire temperature range of the turbine section, meaning that in the case that the or each optical thermometer has an operational temperature range whose lower bound is greater than or equal to approximately 600° C. then the thermocouples are able to provide temperature measurement at temperatures below the operational range of the optical thermometer(s).

The or each thermocouple may be a single immersion thermocouple. Single immersion thermocouples comprise a single, e.g. K-type, thermocouple that is disposed at a first immersion depth into the gas path. Advantageously, single immersion thermocouples are simpler than dual immersion thermocouples that are conventionally used in measuring temperature in the turbine section. Dual immersion thermocouples comprise two, e.g. K-type, thermocouples that are disposed at first and second immersion depths into the gas path, the first and second immersion depths being different to each other.

Where the temperature measurement system comprises a combination of one or more optical thermometers and one or more thermocouples, the first position may be upstream of the second position. By positioning the optical thermometers upstream of the thermocouples, a more accurate circumferential temperature profile can be obtained in a portion of the turbine section where the temperature profile is likely to be less uniform by having a large number of optical thermometers in this portion. At the downstream position of the thermocouples, the circumferential temperature profile is expected to be more uniform due to the mixing that occurs in the turbine section, meaning that fewer thermocouples are typically required to provide an accurate circumferential temperature profile at this position.

Where the temperature system comprises plural thermocouples, the thermocouples may be arranged in a thermocouple array configured to measure a circumferential temperature profile in the working gas at the second position along the axis of the engine. The thermocouple array may comprise four thermocouples, for example, four thermocouples equiangularly spaced about the engine's axis. The thermocouples may be circumferentially aligned or circumferentially misaligned with respective fuel spray nozzles.

The temperature measurement system may further comprise one or more further thermocouples in a further thermocouple array configured to measure a circumferential temperature profile in the working gas at a third position along the axis of the engine, the third position being downstream of the second position. The further thermocouple array may have one or more of the optional features set out above in relation to the thermocouple array at the second position along the axis of the engine.

The total number of thermocouples in the thermocouple array, and/or the number of thermocouples in the further thermocouple array, and/or the number of thermocouples in the temperature measurement system, may be less than the number of fuel spray nozzles. By having the temperature measurement system comprise both optical thermometers and thermocouples, it is possible to reduce the number of thermocouples in the system in comparison to conventional temperature measurement systems for gas turbine engines. The thermocouples may be positioned further downstream in the turbine section than the optical thermometers, and at this downstream location the working gas temperature is expected to be more uniform due to mixing of the working gas as it flows through the turbine. This reduces the number of thermocouples required to obtain an accurate temperature profile.

The turbine section may comprise plural turbines, for example, a high-pressure turbine and a low-pressure turbine, the low-pressure turbine being downstream of the high-pressure turbine. An intermediate-pressure turbine may be interposed between the high-pressure turbine and the low-pressure turbine. Each turbine may comprise one or more circumferential rows of turbine blades. A corresponding circumferential row of nozzle guide vanes may be positioned upstream of a given row of turbine blades. The first position may at the row of nozzle guide vanes within the high-pressure turbine. The second position may be downstream of the first row of turbine blades and corresponding row of nozzle guide vanes in the axial flow direction, but upstream of the final row of turbine blades and corresponding row of nozzle guide vanes in the axial flow direction. Where an intermediate-pressure turbine is present in the turbine section, the second position may be upstream of a row of turbine blades and corresponding row of nozzle guide vanes within the intermediate-pressure turbine in an axial flow direction. The third position may be upstream of the final row of turbine blades and corresponding row of nozzle guide vanes in the axial flow direction but downstream of the penultimate row of turbine blades and corresponding row of nozzle guide vanes in the axial flow direction. Where an intermediate-pressure turbine and a low-pressure turbine are present in the turbine section, the third position may be interposed between the intermediate-pressure turbine and the low-pressure turbine.

In a second aspect there is provided a gas turbine engine comprising, in axial flow sequence, a compressor section, a combustor section having plural fuel spray nozzles, and a turbine section; and wherein the gas turbine engine further comprises the temperature measurement system according to the first aspect or the combination of the temperature measurement system and engine control system according to the second aspect.

In a third aspect there is provided an aircraft having a gas turbine engine according to the third aspect.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art.

Figure 1:
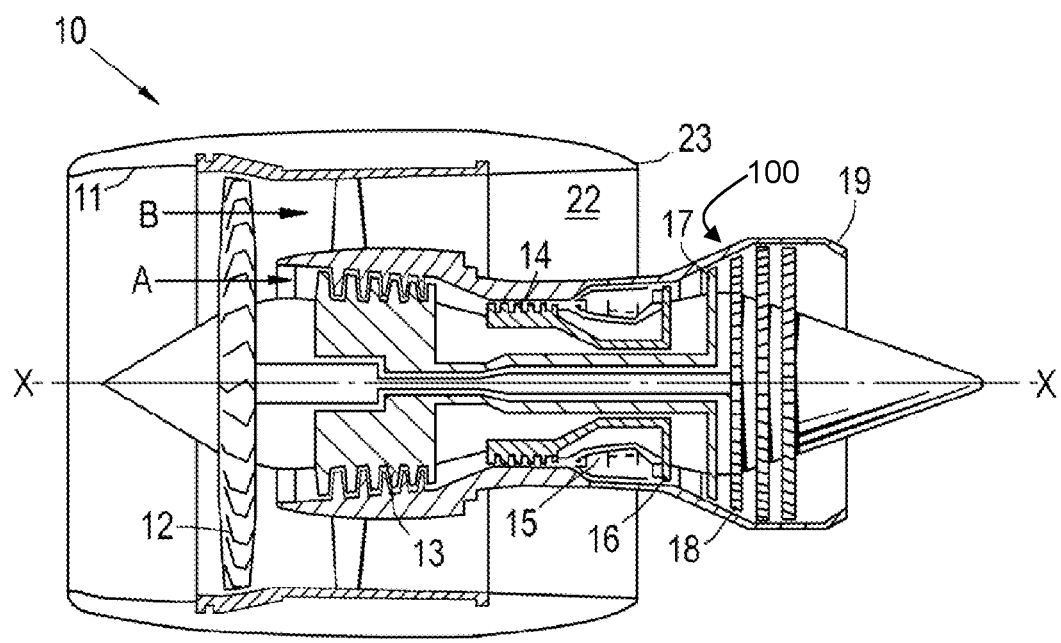
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustor section 15, a high-pressure (HP) turbine 16, an intermediate pressure (IP) turbine 17, a low-pressure (LP) turbine 18 and a core engine exhaust nozzle 19. A nacelle generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustor section 15 where it is mixed with fuel and the mixture combusted. The resultant hot combustion products then expand through, and thereby drive the high, intermediate and low-pressure turbines 16, 17, 18 that together form the turbine section 100, before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
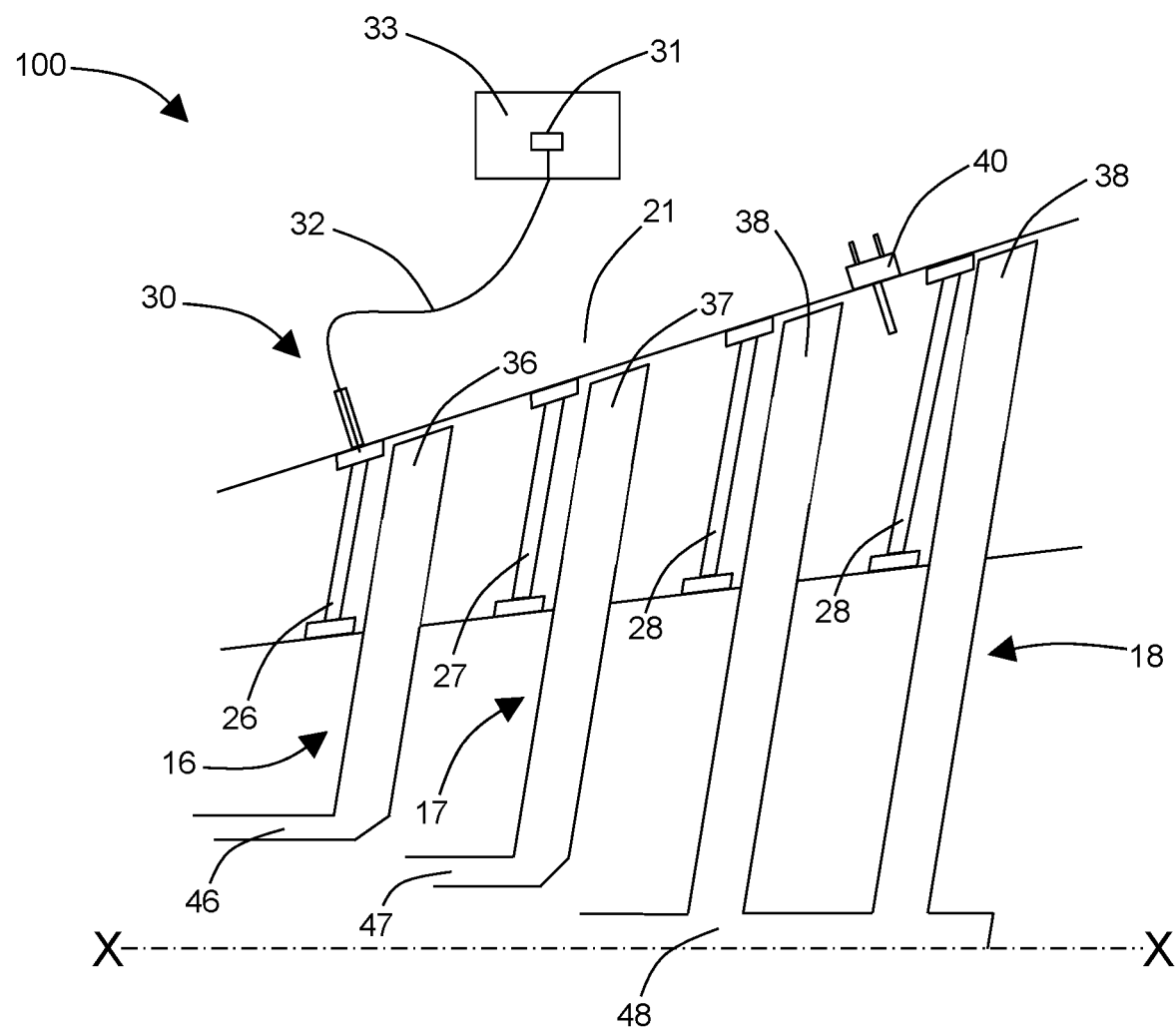
FIG. 2 shows schematically part of a longitudinal cross-section through the turbine section of a gas turbine engine.

FIG. 2 shows schematically part of a longitudinal cross-section through the turbine section 100 of the gas turbine engine 10. The turbine section 100 of FIG. 2 contains the three turbines: the HP turbine 16, the IP turbine 17, and the LP turbine 18. Each turbine 16, 17, 18 connects to a respective interconnecting shaft, with the HP turbine 16 attached at one end of the HP compressor drive shaft 46, the IP turbine 17 connected to the IP drive shaft 47, and the LP turbine 18 connected to the LP shaft 48. The shafts are arranged concentrically, with the HP compressor drive shaft 46 outermost, followed by the IP drive shaft 47 and then the LP shaft 48 at the centre. In FIG. 2, the HP and IP turbines 16, 17 in the turbine section 100 of FIG. 2 are shown each having just a single circumferential row of turbine blades 36, 37, whereas the LP turbine 18 is shown having two circumferential rows of turbine blades 38, but other numbers of rows in each turbine are possible. Immediately upstream of each row of turbine blades 36, 37, 38 is positioned a corresponding circumferential row of nozzle guide vanes (NGVs) 26, 27, 28. The NGVs 26, 27, 28 are washed by the working gas of the engine and the rows of NGVs 26, 27, 28 deflect the working gas flow passing through the turbine section 100 so that each row of turbine blades 36, 37, 38 can extract energy the gas flow more efficiently. In the example of FIG. 2, there is shown one row of HP NGVs 26, one row of IP NGVs 27 and two rows of LP NGVs 28 corresponding to the respective rows of blades 36, 37, 38. Surrounding the turbines is the turbine casing 21. In FIG. 2, the temperature measurement system comprises both optical thermometers 30 and thermocouples 40, The optical thermometers 30 are provided in a circumferential optical thermometer array around the engine 10 and the thermocouples 40 are provided in a circumferential thermocouple array around the engine 10. The optical thermometers 30 are configured to measure the temperature of the HP NGVs 26 and the thermocouples 40 are configured to measure the working gas temperatures in the turbine section 100. The optical thermometers' measurement points are upstream of those of the thermocouples 40.

The optical thermometers 30 each comprise an optical fibre 32 and a photodiode 31, the optical fibre comprising a first end that is disposed in a thermo well within a respective HP NGV 26 and a second end connected to the photodiode 31. Since the optical thermometers 30 are configured to measure the temperature of respective HP NGVs 26, the first end of the optical fibre 32 of each optical thermometer 30 is disposed at a first position along the axis X-X of the engine at which the HP NGV 26 is positioned. Electromagnetic radiation is radiated from the surface of the thermo well in each HP NGV 26 and a portion of this radiation is collected by the first end of the respective optical fibre 32. The radiation collected by the first end of the optical fibre 32 is transmitted along the fibre to the photodiode 32, which converts the radiation into an electrical signal. The photodiodes 32 are located within an electronic photodiode sensing unit (EPSU) 33, with the EPSU 33 configured to determine the temperature of each of the HP NGVs 26 provided with an optical thermometer 30 from the signal generated by the respective photodiode 31. The thermo wells provided in the HP NGVs 26 have a geometry that produces a black body cavity i.e. a cavity having an emissivity equal to about one. Thermo wells approximate a black body cavity when the depth exceeds their diameter by a factor of at least five; by way of example, a thermo well in the HP NGV 26 may be cylindrical, having a diameter of 1.25 mm and a depth of 15 mm. By conducting calibration tests for the optical thermometers and thermo wells at known temperatures, the electrical signal generated by the photodiodes 31 in response to the radiation transmitted to them via their respective optical fibres 32 from the surface of the respective thermo wells can be converted into a temperature value.

The optical fibres 32 each comprise a sapphire optical fibre section and, optionally, a silica glass optical fibre section, the sapphire optical fibre section being used where the optical fibre 32 is exposed to harsh working conditions (primarily high temperatures) of turbine section 100 that a silica glass optical fibre section would not withstand (the same applies to optical thermometers configured to measure the temperature of a component in the combustor section 15). Sapphire is used for a section of the optical fibre 32 because it is highly inert and therefore able to withstand the high temperature environment of the turbine section 100. Transmitting the radiation from the thermo wells to the respective photodiodes 31 using optical fibres 32 allows the photodiodes 31 and the EPSU 33 to be located in a suitable environment where their electronic components will not be damaged by exposure to very high temperatures. The optical thermometers 30 have a measurement range from approximately 500° C. to 1800° C., with the highest measurement accuracy generally being provided for temperatures above 800° C. As the temperature of the component in which the thermo well is provided (i.e. the HP NGVs 26 in the case of FIG. 2) increases, the emissivity of the thermo well increases (typically non-linearly with temperature) and hence the signal strength and the accuracy of the temperature measurement improves at higher temperatures, which coincides with when it is most important to have an accurate measure of temperature, because it is at high temperatures that materials and cooling systems in the combustor section 15 and/or turbine section 100 experience the most exacting conditions.

The thermocouples 40 shown in FIG. 2 are single immersion thermocouples and are positioned downstream of the optical thermometers 30, being disposed at a second position along the axis X-X of the engine between the final row of LP NGVs 28 and the penultimate row of LP turbine blades 38.

The thermocouples 40 have a temperature measurement range that covers the entire temperature range of the working gas at the second position, including at light-up and flame out. Accordingly, although the optical thermometers 30 may be unsuited to determining if the engine is lit, whether flame out has occurred, and what the temperature distribution is at low temperatures, the thermocouples 40 can be used for these tasks.

Figure 3A:
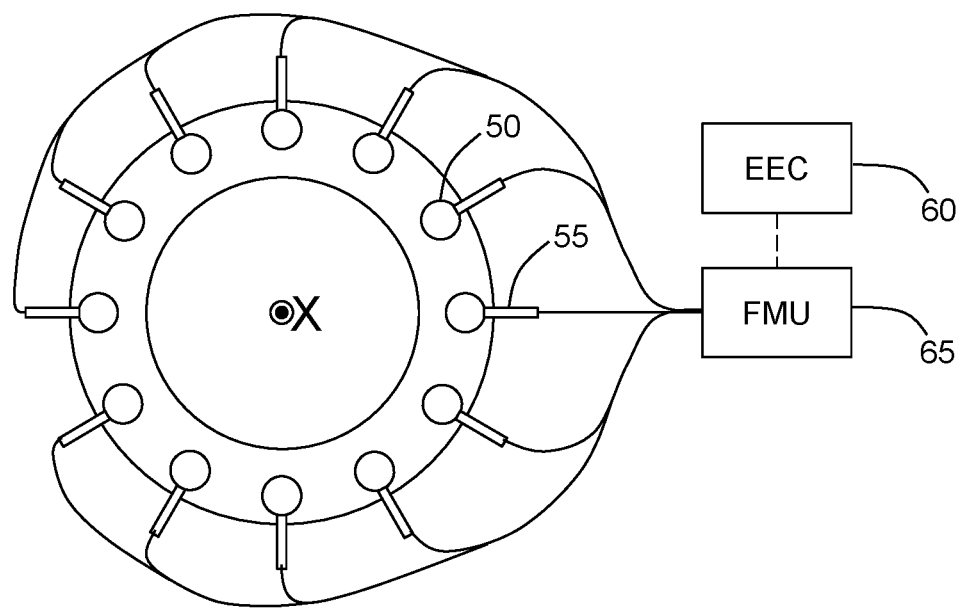
FIGS. 3A-3C are schematics showing the positions of fuel spray nozzles, optical thermometers and thermocouples at an axial position along the engine in the turbine section, a first axial position in the turbine section, and second axial position in the turbine section, respectively.
Figure 3B:
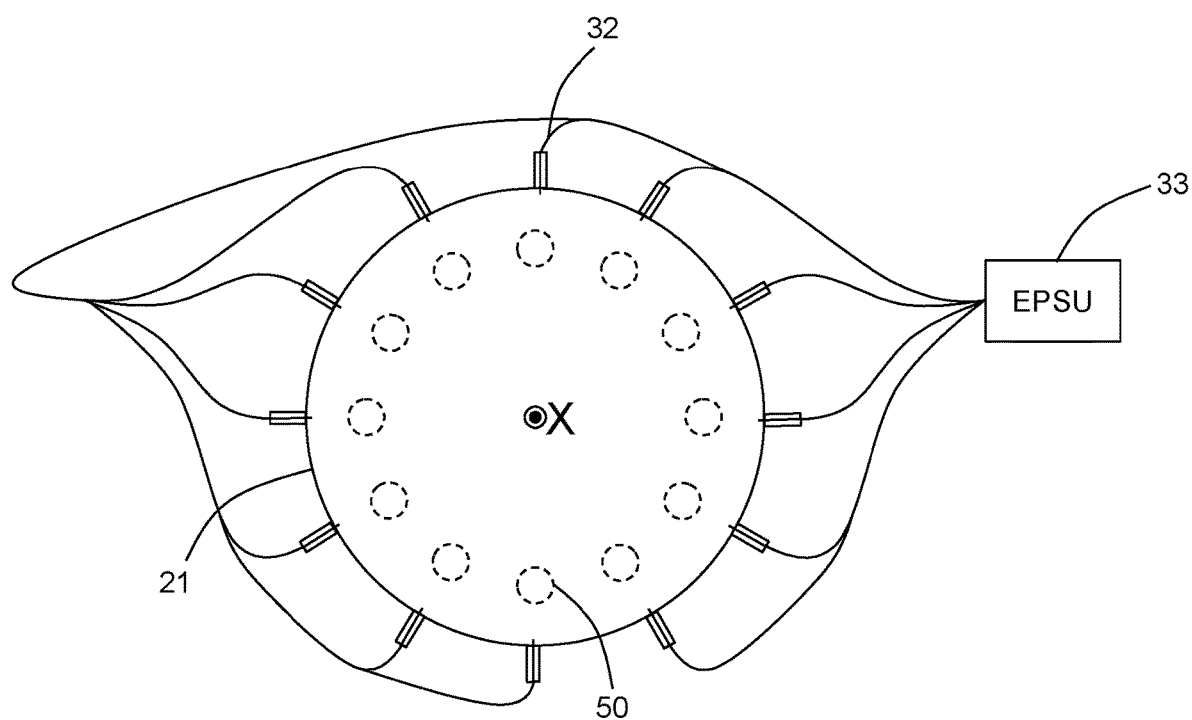
Figure 3C:
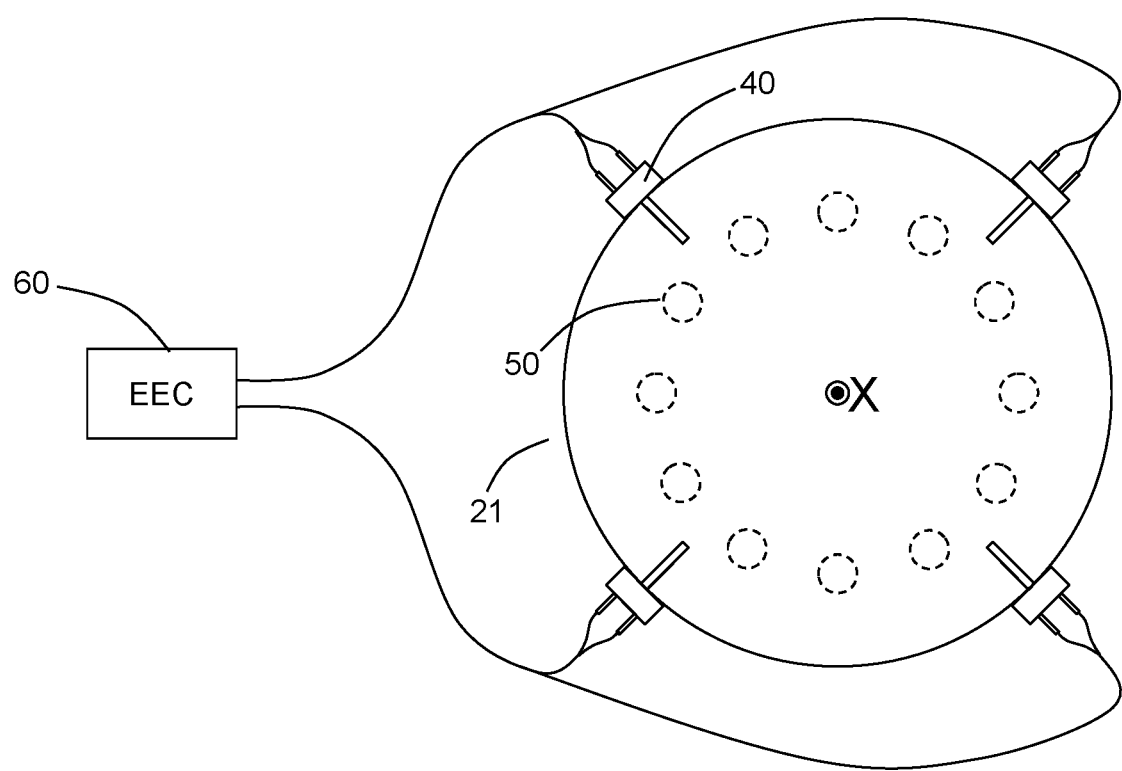

FIGS. 3A-3C show transverse cross-sections through the combustor section 15 and turbine section 100 of the gas turbine engine 10 in FIG. 2, and provide more detail on the circumferential distribution of components of the temperature measurement system.

FIG. 3A is a transverse cross-section through the combustor section 15 of the gas turbine engine 10. A plurality of fuel spray nozzles 50 are arranged circumferentially around the combustor, each fuel spray nozzle 50 generating a spray of fuel from fuel injected by a respective fuel injector 55. The combustor section 15 may take the form of a multi-chamber combustor, an annular-chamber combustor or a turbo-annular-chamber combustor. The combustor in FIG. 3A comprises twelve fuel spray nozzles 50 and respective fuel injectors 55, equiangularly spaced about the axis X-X of the engine. An engine electronic controller (EEC) 60 within a control system (i.e. a Full Authority Digital Electronic Controller (FADEC)) is able to exert control over fuel valves via a fuel metering unit (FMU) 65.

It is desirable to maintain a circumferential temperature profile within the combustor section 15 and turbine section 100 of the engine 10 that is as uniform as possible and as close to the set point temperature in the FADEC, so that the rate of wear of engine components is uniform (i.e. avoiding different angular sectors being exposed to substantially different temperatures over extended periods of time) and as low as possible.

Typically, as shown in the transverse cross-section of FIG. 3B through the turbine section 15 at the aforementioned first position, the temperature measurement system comprises a plurality of optical thermometers 30 (each in the form of an optical fibre 32 having a first end disposed in a thermo well and a second end connected to a respective photodiode (not shown in FIG. 3B) within the EPSU 33) equally spaced circumferentially around the turbine casing 21 in an array. The first position is in the HP turbine 16 (see FIG. 2), with the first end of each optical fibre 32 disposed in a thermo well provided in a respective HP NGV 26 (the HP NGVs 26 are not shown in FIG. 3B). In FIG. 3B, the positions of the fuel spray nozzles 50 are projected onto the cross section to indicate their positions relative the first ends of the optical fibres 32. Although in FIG. 3B the first end of each optical fibre 32 is circumferentially aligned with a respective fuel spray nozzle 50, in practice, the swirl of the gas flow through the engine, the mixing of gas from adjacent sectors down the engine and the fuel spray nozzles 50 spraying fuel into adjacent sectors means that there is not a simple correspondence between a single fuel spray nozzle 50 and a respective optical thermometer 30. Nevertheless, by positioning the optical thermometer array further upstream in the engine than a conventional thermocouple-based array and accounting for the above factors, the temperature measurement system can correlate the temperature at a certain circumferential position to the performance of one or more fuel spray nozzles 50.

FIG. 3C is a transverse cross section through the turbine section 100 at the aforementioned second position that is upstream of the final row of LP NGVs 38, but downstream of the penultimate row of turbine blades 28 in the LP turbine 18 (see FIG. 2). The temperature measurement system further comprises the four thermocouples 40 disposed such as to measure the temperatures of the working gas at this second position. The four thermocouples 40 are connected to the EEC 60 such that the temperatures they measure can inform control of the engine 10, and in particular the FMU 65. Similarly to FIG. 3B, the positions of the fuel spray nozzles 50 are projected onto the cross section to indicate their positions relative the thermocouples 40. The four thermocouples 40 form a thermocouple array configured to measure a circumferential temperature profile in the working gas, with the thermocouples 40 approximately equiangularly spaced around the turbine casing 21. There are fewer thermocouples 40 in the thermocouple array than there are optical thermometers 30 in the optical thermometer array and thus also fewer thermocouples 40 in the thermocouple array than there are fuel spray nozzles 50 in the combustor section 15. There is no one-to-one correspondence of thermocouples 40 to fuel spray nozzles 50 and in FIG. 3C the thermocouples 40 are shown not circumferentially aligned with a respective fuel spray nozzle 50.

A conventional working gas temperature measurement system for use in the turbine section of a gas turbine engine 10 typically comprises a greater number of thermocouples 40 than are shown in FIG. 3C. A common arrangement, for example, would be 14 dual immersion thermocouples 40 set up in two networks at different positions along the axis of the engine. However, due to the optical thermometer array disposed upstream of the thermocouple array in the present arrangement shown in FIGS. 2 and 3A-3C, it is possible to reduce the number of thermocouples 40 needed to accurately measure the temperature profile of the working gas at the second position in the turbine section 100. In particular, because the thermocouple array is positioned further downstream than the optical thermometer array, it is unnecessary to have as large a number of thermocouple measurement points, since the working gas should be well mixed and therefore closer to a homogenous temperature by the time it reaches this second position.

As discussed above, the thermocouples 40 generally have a different measurement range to the measurement range of the optical thermometers 30. In particular, the low temperature sensitivity of the thermocouples 40 allows them to detect events such as light-up and flame-out. However, because there are relatively few thermocouples 40 in the temperature measurement system, there may be a concern that the accuracy of the circumferential temperature profiles provided by the thermocouples 40 at low temperatures outside the measurement range of the optical thermometers 30 may be reduced. However, in practice this is not a significant problem because at such low temperatures the rate of wear on engine components is substantially lower than at normal operating temperatures, and consequently variations in the circumferential temperature profile at these low temperatures are unlikely to lead to major damage to the components of the turbine section 100.

Although not illustrated in FIGS. 2 and 3A-3C, the temperature measurement system may include a further thermocouple array configured to measure a circumferential temperature profile in the working gas at a third position along the axis of the engine, the third position being downstream of the second position. The further thermocouple array is typically configured in a similar manner to the thermocouple array illustrated in FIG. 3C. However, the further thermocouple array may contain fewer thermocouples than the thermocouple array configured to measure working gas temperatures at the second position. This may be based on the third position being even further downstream along the axis of the engine than the second position (and therefore the temperature profile is expected to be more uniform than at the second position), and/or space constraints within the engine.

In the forgoing description of FIGS. 3A-3C, the thermo wells into which the first end of the optical fibres 32 of the optical thermometers 30 are disposed are provided in the HP NGVs 26. However, a thermo well for an optical thermometer 30 can also be provided in other components of the gas turbine engine. By way of example, a thermo well can be provided in the lining of the combustor in order to measure the combustor liner temperature. Alternatively, a test body may be disposed in the combustor section 15 or the turbine section 100 such that it is washed by the working gas of the engine and a thermo well can be provided in the test body for the first end of an optical fibre 32 to be inserted into.

Figure 4A:
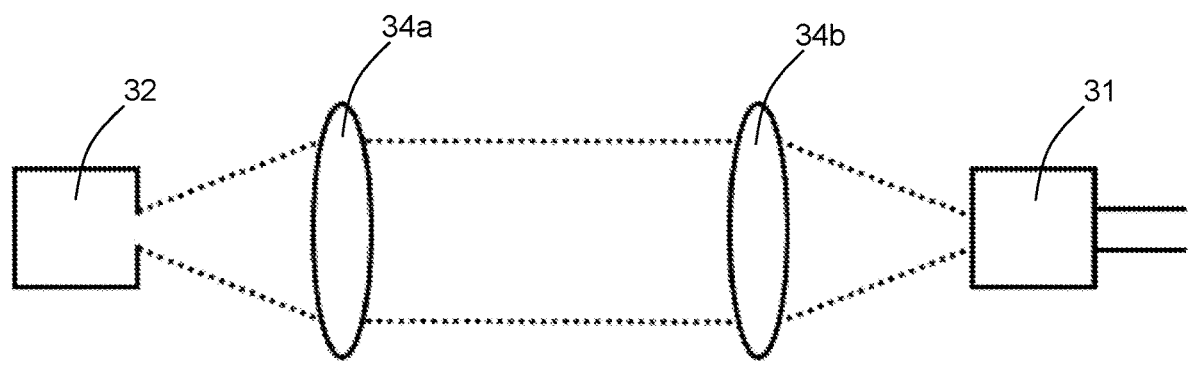
FIGS. 4A-4C show schematics of couplings between an optical fibre and a photodiode.
Figure 4B:
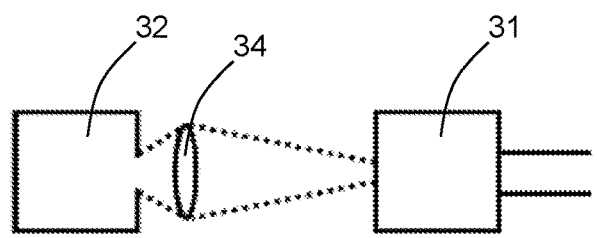
Figure 4C:
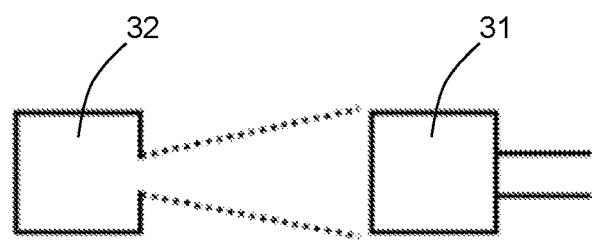

FIGS. 4A-4C provide schematics of possible couplings between the optical fibre 32 and the photodiode 31 within an optical thermometer 30. In both FIG. 4A and FIG. 4B, coupling optics are interposed between the optical fibre 32 and the photodiode 31 to focus the radiation exiting the second end of the optical fibre onto the photodiode 31. In FIG. 4C coupling optics are omitted.

In FIG. 4A, the second end of the optical fibre 32 is placed up to the photodiode 31 with two lenses 34a and 34b interposed therebetween. Lens 34a is a collimating lens and lens 34b then focusses the collimated radiation on to the photodiode 31. This arrangement ensures that any minor misalignment in any of the three axes will not result in signal reduction or loss. Likewise, any vibrations should not cause the radiation transmitted by the optical fibre 32 to fall outside detection region of the photodiode 31. The arrangement in FIG. 4A is versatile in that it allows the photodiode 31 to be changed to a different configuration without needing the coupling optics to be modified.

In FIG. 4B, the second end of the optical fibre 32 is placed up to the photodiode 31 with a single lens 34 interposed therebetween, which both collects the radiation transmitted by the optical fibre and focusses this onto the photodiode 31. The coupling optics illustrated in FIG. 4B allow the coupling between the optical fibre 32 and the photodiode 31 to be made much more compact than the arrangement in FIG. 4A. However, this is at the expense of versatility-changes to the fibre 32 and/or the detector 32 would likely require modification of the coupling optics.

In FIG. 4C, the second end of the optical fibre 32 is placed up to the photodiode directly 31, without any lenses interposed therebetween. In order to facilitate this arrangement, the fibre width, photodiode window and their relative positions are arranged such that the rays of light from the fibre are contained within the window of the photodiode. The arrangement in FIG. 4C allows the space occupied by the coupling to be reduced in comparison to the arrangements of FIGS. 4A and 4B.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The terms "about" and "approximately" in relation to a numerical value is optional and means for example +/−10%.

LIST OF FEATURES

Gas turbine engine 10
Air intake 11
Propulsive fan 12
Intermediate-pressure compressor 13
High-pressure compressor 14
Combustor section 15
High-pressure turbine 16
Intermediate-pressure turbine 17
Low-pressure turbine 18
Core engine exhaust nozzle 19
Turbine casing 21
Bypass duct 22
Bypass exhaust nozzle 23
High-pressure nozzle guide vane 26
Intermediate-pressure nozzle guide vane 27
Low-pressure nozzle guide vane 28
Optical thermometer 30
Photodiode 31
Optical Fibre 32
Electronic photodiode sensing unit 33
Lens 34, 34a, 34b
High-pressure turbine blade row 36
Intermediate-pressure turbine blade row 37
Low-pressure turbine blade row 38
Thermocouple 40
High-pressure compressor drive cone 46
Intermediate-pressure drive shaft 47

Low-pressure shaft 48
Fuel spray nozzle 50
Fuel injector 55
Engine electronic controller 60
Fuel metering unit 65
Turbine section 100

The invention claimed is:

1. A temperature measurement system for a gas turbine engine, the gas turbine engine comprising, in axial flow sequence, a compressor section, a combustor section having plural fuel spray nozzles, and a turbine section; the temperature measurement system comprising one or more optical thermometers, each optical thermometer being configured to measure a temperature of a component washed by a working gas of the gas turbine engine, the or each component being in the combustor section or the turbine section at a first position along an axis of the gas turbine engine, wherein
the turbine section comprises a circumferential row of nozzle guide vanes at an entrance into the turbine section from the combustor section;
the or each optical thermometer is configured to measure a temperature of a respective nozzle guide vane; and
each of the optical thermometers is radially outward of the respective nozzle guide vane relative to the axis of the gas turbine engine.

2. The temperature measurement system according to claim 1, comprising a plurality of the one or more optical thermometers in an optical thermometer array, the optical thermometer array configured to measure a circumferential temperature profile of the gas turbine engine at the first position.

3. The temperature measurement system according to claim 2, wherein a number of optical thermometers within the optical thermometer array is equal to a number of fuel spray nozzles.

4. The temperature measurement system according to claim 1, further comprising:
one or more test bodies configured to be disposed in the combustor section or turbine section such that the or each test body is a component washed by the working gas of the gas turbine engine.

5. The temperature measurement system according to claim 1, wherein:
the or each optical thermometer comprises an optical fibre and a respective photodiode, the optical fibre comprising a first end configured to collect electromagnetic radiation emitted from a respective component, and a second end connected to the respective photodiode.

6. The temperature measurement according to claim 5, wherein the second end of the or each optical fibre is connected to the respective photodiode by coupling optics comprising one or more lenses.

7. The temperature measurement system according to claim 5, wherein the or each optical fibre comprises a sapphire optical fibre section.

8. The temperature measurement system according to claim 1, further comprising one or more thermocouples configured to measure working gas temperatures in the turbine section at a second position along the axis of the gas turbine engine.

9. The temperature measurement system according to claim 8, wherein the or each thermocouple is a single immersion thermocouple.

10. The temperature measurement system according to claim 8, wherein the first position is upstream of the second position.

11. The temperature measurement system according to claim 8, comprising a plurality of the one or more thermocouples in a thermocouple array configured to measure a circumferential temperature profile in the working gas.

12. The temperature measurement system according to claim 11, wherein a number of thermocouples in the thermocouple array is less than a number of fuel spray nozzles.

13. The temperature measurement system according to claim 11, further comprising one or more further thermocouples in a further thermocouple array and configured to measure a circumferential temperature profile in the working gas at a third position along the axis of the gas turbine engine, the third position being downstream of the second position.

14. A gas turbine engine comprising, in axial flow sequence, a compressor section, a combustor section having plural fuel spray nozzles, and a turbine section; and
wherein the gas turbine engine further comprises the temperature measurement system according to claim 1.

15. The temperature measurement system according to claim 1, further comprising a plurality of the optical thermometers in an optical thermometer array, wherein each of the optical thermometers in the array is circumferentially aligned with a respective fuel spray nozzle of the plural fuel spray nozzles.

16. The temperature measurement system according to claim 15, the temperature measurement system further comprising an array of thermocouples, the array of thermocouples being positioned downstream of the optical thermometer array along the axis of the gas turbine engine.

* * * * *